Oct. 28, 1941.   H. C. KRONE ET AL   2,260,385
AUDIBLE SIGNAL LIQUID LEVEL INDICATOR
Filed May 7, 1941   2 Sheets-Sheet 1

INVENTORS:
Howard C. Krone & William Meyer,
BY
George D. Richards
ATTORNEY.

Oct. 28, 1941.    H. C. KRONE ET AL    2,260,385
AUDIBLE SIGNAL LIQUID LEVEL INDICATOR
Filed May 7, 1941    2 Sheets-Sheet 2

INVENTORS:
Howard C. Krone & William Meyer,
BY
George D. Richards
ATTORNEY.

Patented Oct. 28, 1941

2,260,385

UNITED STATES PATENT OFFICE 2,260,385

AUDIBLE SIGNAL LIQUID LEVEL INDICATOR

Howard C. Krone, River Edge, and William Meyer, East Orange, N. J., assignors to A. W. Wheaton Brass Works, Newark, N. J., a corporation of New Jersey Application May 7, 1941, Serial No. 392,264

5 Claims. (Cl. 116—109)

This invention relates to improvements in audible signal liquid level indicators for use in filling tanks, cans or other containers; and the invention has reference, more particularly, to a novel device which will sound an audible signal when the rising level of liquid delivered into a tank, can or other container nears the limit of the capacity of the latter, thus giving timely notice to the operator in charge of the filling operations to discontinue delivery of liquid to the tank, can or other container.

This invention, in its broader aspects, has for an object to provide a novel audible signal device for the purposes stated which will silently vent the air which is displaced by a liquid delivered into a tank, can or the like, until the rising level of the liquid nears the limit of capacity of the latter, and is thereupon brought into contact with a portion of the device in such manner as to trap an air column therein subject to vibration with audible sound producing effect.

This invention has for another and more specific object to provide an audible signal device, having the above mentioned operating characteristics, in combination with the filling nozzle of a liquid delivery line, whereby operative application of the filling nozzle to the bung or filling opening of a tank, can or the like will automatically relate the signal device in operative communication with the interior of said tank, can or the like.

Other objects of this invention, not at this time more particularly enumerated, will be understood from the following detailed description of the same.

An illustrative embodiment of this invention is shown in the accompanying drawings, in which—

Figure 1:
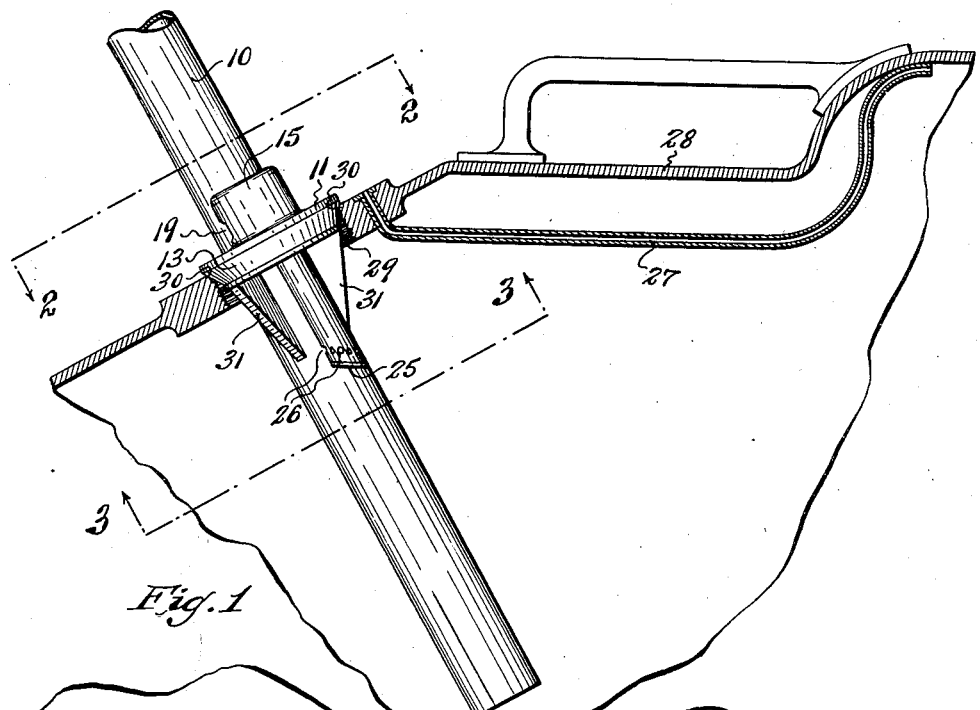
Figures 2, 3:
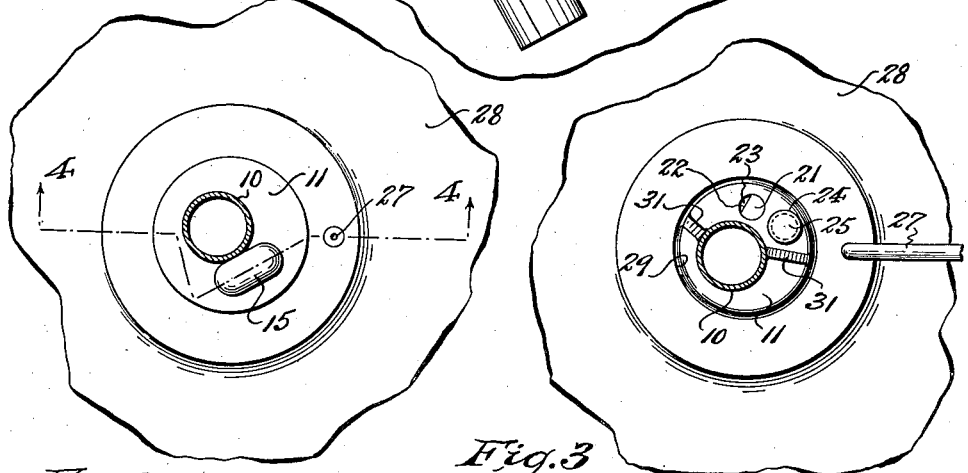

Fig. 1 is a fragmentary sectional view of a can, to the filling opening or bung of which is operatively applied a filling nozzle provided with the audible signal liquid level indicator according to this invention; Fig. 2 is a horizontal sectional view, taken on line 2—2 in Fig. 1; and Fig. 3 is another horizontal sectional view, taken on line 3—3 in Fig. 1.

Figure 4:
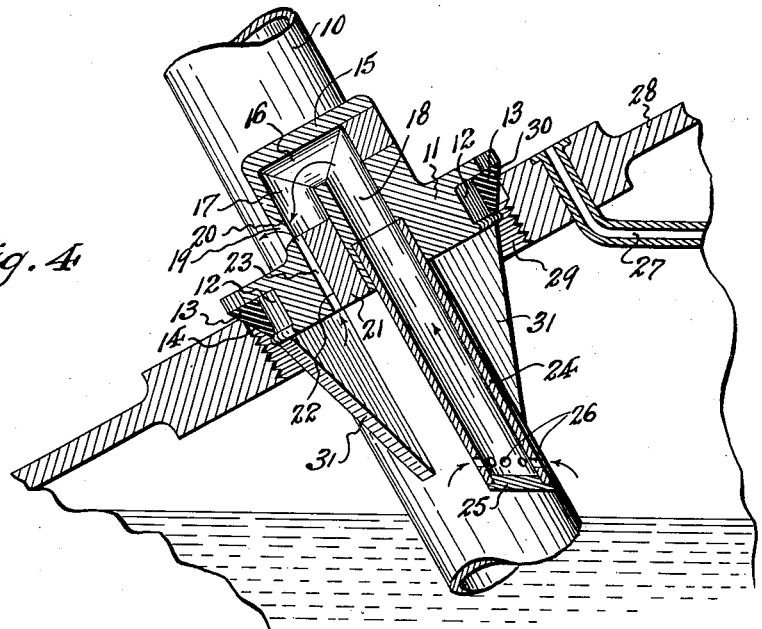
Figure 5:
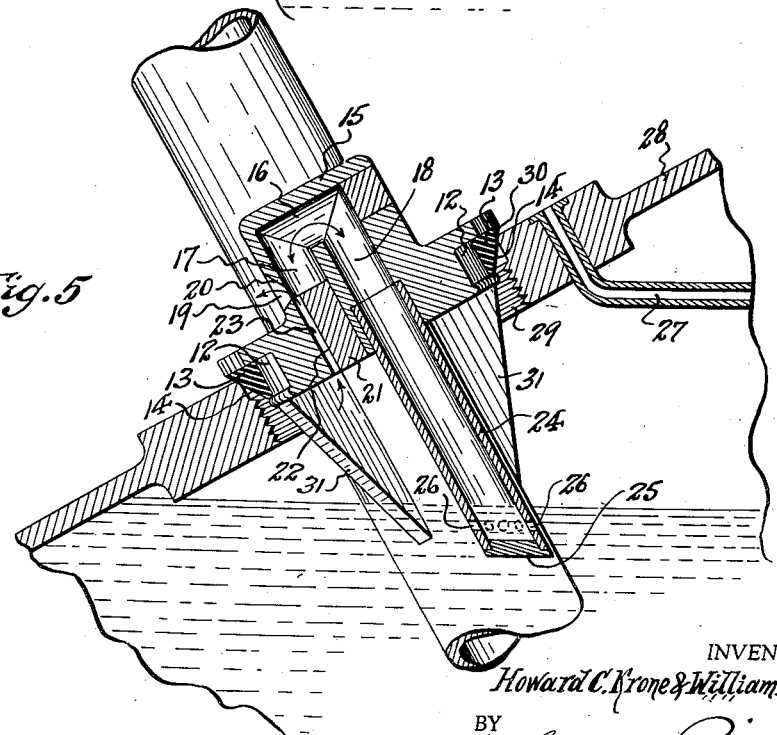

Fig. 4 is a vertical sectional view, taken on line 4—4 in Fig. 2, but drawn on an enlarged scale, the same showing the signal device in initial condition wherein it silently vents air displaced from the can by the liquid delivered thereinto; and Fig. 5 is a similar view showing the rising level of liquid in contact with a portion of the signal device so as to trap a column of air within the latter subject to vibration with audible sound producing effect.

Similar characters of reference are employed in the above described views, to indicate corresponding parts.

In the illustrative embodiment of this invention shown in the accompanying drawings, the audible signal device is arranged in combination with the filling nozzle 10 of a delivery line or hose leading from a suitable source of liquid supply. Such embodiment includes an annular stopper body 11 through which said filling nozzle 10 extends; the former being rigidly secured or fastened to the latter. Formed in the periphery of said stopper body 11 is an annular seating channel 12 in which is carried a sealing gasket 13, which is preferably formed with an inwardly and downwardly tapered or inclined external face 14. The filling nozzle 10 passes through the stopper body 11 at a point eccentric to the center of the latter, whereby to provide a space offset from said filling nozzle which is occupied by the signal device structure.

The signal device structure comprises an upwardly extending boss 15 rising from the top or outer surface of said stopper body 11, and preferably formed integrally therewith. Formed to extend through said stopper body 11 from its bottom or inner face and through said boss 15 is a passage 16 of inverted U-shape including a forward leg 17 and a rearward leg 18. The wall of said boss 15 contiguous to said forward leg 17 of the passage 16 is pierced by a whistle opening 19 the upper margin of which is defined by an inwardly and downwardly chamfered lip 20 converging on the forward leg 17 of said passage 16. Inserted in the open end of said forward passage leg 17 is a tongue plug 21 having a flattened face 22 which opposes the side of the passage leg 17 in which the whistle opening is provided, thus providing a throat passage 23 leading from the underside of said stopper body 11 to the whistle opening 19 so that its discharge end is directed toward the lip 20 of the latter. Connected in communication with the open end of the rearward passage leg 18 is a tubular extension 24 thereof, which depends from the under or inner side of said stopper body 11. The length of this extension 24 is such as to allow the rising level of liquid delivered into a container through the filling nozzle 10 to contact the free end portion thereof at a point substantially below the liquid level limit determined by the capacity of the container. Preferably the lower free end of the extension 24 is closed by an end plug 25, and communication between the interior of a container being filled and the interior of said extension is provided by one or more openings 26 with which the wall of the latter is provided. It has been found preferable that the total area of the opening or openings 26 substantially correspond to the area of the throat passage 23. In the event the container being filled is provided with an independent fixed vent, such e. g. as the vent passage 27 of the can shown in the drawings, and which will be presently described, then the combined areas of said fixed vent passage 27 and the opening or openings 26 of the extension 24 should preferably substantially correspond to that of the throat passage 23.

In the drawings, the reference character 28 indicates the body of a can or container having an internally threaded bung or filling opening 29 to normally receive a closure plug (not shown). To fill the can 28, the closure plug being removed from the bung or filling opening 29, the filling nozzle 10 is inserted through the latter into the interior of said can, until the sealing gasket 13 of the stopper body 11 engages the margins 30 of said bung or filling opening. By application of inward thrusting pressure upon the filling nozzle 10, the stopper body 11 is pressed home so that the sealing gasket 13 will form a hermetically sealing contact with said bung or filling opening margins 30. To assist in guiding the stopper body 11 to such bung or filling opening sealing position, the same is provided with inclined radial guide ribs 31 which lead from the periphery of the stopper body to converge upon the filling nozzle 10.

When the filling nozzle has been affixed to the bung or filling opening of the can as above described, by manipulation of suitable control valve mechanism (not shown) with which the same is provided, flow of liquid may be initiated and directed into the can interior. As the level of the liquid delivered into the can rises, the air within the can is displaced by the liquid and compressed so as to seek escape from the can interior. Since both legs of the U-shaped passage are initially in communication with the can interior respectively through the throat passage 23 and the opening or openings 26, the escaping air may flow outwardly both through the leg 18 from its extension 24 and through the leg 17 from the throat passage 23, and thence to the atmosphere through the whistle opening 19, such paths of flow being indicated by the arrows in Fig. 4. Under these conditions, outward movement of air through both legs of the U-shaped passage 16 will substantially balance each other, so that no vibrating air column is formed in the passage, and consequently the air vents through the whistle opening 19 without producing any whistling sound.

As the level of the liquid rising in the can interior reaches and passes the opening or openings 26 in the extension 24 communication of air therethrough and into the passage leg 18 is prevented, and consequently a column of air is trapped in the U-shaped passage beyond the whistle opening 19. Air, however, continues to pass outwardly through the throat passage 23, and thence through the whistle opening 19. The movement of this outgoing air sets up a vibration of the trapped air column, whereby an audible whistling signal is produced (see Fig. 5). This audible signal is sounded as the level of liquid in the can nears the limit of the can capacity, and consequently the operator is given timely notice to shut off supply of liquid through the filling nozzle into the can.

The advantage of combining the novel audible signal device with a filling nozzle will be obvious, since it permits a single signal means to serve any number of cans by merely operatively applying the filling nozzle to the cans. The novel signal device structure per se, however, may be built into a tank, can or other container as a permanent fixture if it is so desired.

We are aware that various changes could be made in the above described constructions, and that widely different embodiments of this invention could be made without departing from the scope thereof as defined in the following claims. It is therefore intended that all matter contained in the foregoing description or shown in the accompanying drawings shall be interpreted as illustrative and not in a limiting sense.

We claim:

1. In combination, a filling nozzle, a stopper body through which the filling nozzle extends in fixed connection therewith, said stopper body being adapted to close a container filling opening against air egress when said filling nozzle is inserted therethrough, and an audible signal means carried by said stopper body, said signal means including an inverted U-shaped passage initially open at both ends to the interior of said container, said passage having in one leg a whistle means and having an extension connected with its other leg provided with air admission means subject to be closed by rising liquid delivered into said container, whereby to trap a vibrating column of air within said U-shaped passage to thereupon render said whistle means operative.

2. In combination, a filling nozzle, a stopper body through which the filling nozzle extends in fixed connection therewith, said stopper body having a sealing gasket means to engage the margins of a container filling opening for sealing the same against air egress when said filling nozzle is inserted therethrough, and an audible signal means carried by said stopper body, said signal means including an inverted U-shaped passage initially open at both ends to the interior of said container, said passage having in one leg a whistle means and having an extension connected with its other leg provided with air admission means subject to be closed by rising liquid delivered into said container, whereby to trap a vibrating column of air within said U-shaped passage to thereupon render said whistle means operative.

3. In combination, a filling nozzle, a stopper body through which the filling nozzle extends in fixed connection therewith, said stopper body having a sealing gasket means to engage the margins of a container filling opening for sealing the same against air egress when said filling nozzle is inserted therethrough, and an audible signal means carried by said stopper body, said signal means including an inverted U-shaped passage the legs of which open through the underside of said stopper body, a tubular extension prolonging one leg of said passage for projection into said container interior, said extension having air admission means adjacent its free end for communication with the container interior subject to be closed by rising liquid within the latter, the other leg of said passage having a lateral whistle opening to communicate with the atmosphere, and a tongue plug affixed in the open end of said latter passage leg, said tongue plug being shaped to provide an outgoing throat passage terminating adjacent to said whistle opening.

4. An audible signal means for association with a container to be filled with a liquid content, said signal means including an inverted U-shaped passage initially open at both ends to the interior of said container, said passage having in one leg a whistle means and having an extension connected with its other leg provided with air admission means subject to be closed by rising liquid delivered into said container, whereby to trap a vibrating column of air within said U-shaped passage to thereupon render said whistle means operative.

5. An audible signal means for association with a container to be filled with a liquid content, said signal means including an inverted U-shaped passage the legs of which are both open to the container interior, a tubular extension prolonging one leg of said passage for projection into said container interior, said extension having air admission means adjacent to its free end for communication with the container interior subject to be closed by rising liquid within the latter, the other leg of said passage having a lateral whistle opening to communicate with the atmosphere, and a tongue plug affixed in the open end of said latter passage leg, said tongue plug being shaped to provide an outgoing throat passage terminating adjacent to said whistle opening.

HOWARD C. KRONE.
WILLIAM MEYER.